(12) United States Patent
Hirzel et al.

(10) Patent No.: US 11,514,895 B2
(45) Date of Patent: **\*Nov. 29, 2022**

(54) DISCOVERING WINDOWS IN TEMPORAL PREDICATES

(71) Applicant: INTERNATIONAL BUSINESS MACHINES CORPORATION, Armonk, NY (US)

(72) Inventors: Martin J. Hirzel, Ossining, NY (US); Christopher Hyland, Foxboro, MA (US); Nicolas C. Ke, Wissous (FR)

(73) Assignee: INTERNATIONAL BUSINESS MACHINES CORPORATTON, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/558,438

(22) Filed: Sep. 3, 2019

(65) Prior Publication Data

US 2019/0385598 A1    Dec. 19, 2019

Related U.S. Application Data

(63) Continuation of application No. 14/748,338, filed on Jun. 24, 2015, now Pat. No. 10,460,724, which is a
(Continued)

(51) Int. Cl.
*G06F 16/24* (2019.01)
*G10L 15/18* (2013.01)
(Continued)

(52) U.S. Cl.
CPC ...... *G10L 15/1822* (2013.01); *G06F 16/2477* (2019.01); *G06F 16/3341* (2019.01);
(Continued)

(58) Field of Classification Search
None
See application file for complete search history.

(56) References Cited

U.S. PATENT DOCUMENTS

| 7,673,242 B1 | 3/2010 | Huntington et al. |
| 7,865,546 B1 * | 1/2011 | Tuzhilin .............. H04L 12/6418 709/202 |

(Continued)

OTHER PUBLICATIONS

Jesse Gebhardt, The Don Data, posted on Sep. 29, 2014, http://thedondata.blogspot.com/2014/09/aggregate-bins-summarized-bins.html . Reference applied and recorded within prosecution history of U.S. Appl. No. 14/748,338.*

(Continued)

*Primary Examiner* — Richard Z Zhu
(74) *Attorney, Agent, or Firm* — Tutunjian & Bitetto, P.C.; Joseph Petrokaitis

(57) ABSTRACT

A method and system are provided. The method includes separating a predicate that specifies a set of events into a temporal part and a non-temporal part. The method further includes comparing the temporal part of the predicate against a predicate of a known window type. The method also includes determining whether the temporal part of the predicate matches the predicate of the known window type. The method additionally includes replacing (i) the non-temporal part of the predicate by a filter, and (ii) the temporal part of the predicate by an instance of the known window type, responsive to the temporal part of the temporal predicate matching the predicate of the known window type. The instance is parameterized with substitutions used to match the temporal part of the predicate to the predicate of the known window type.

18 Claims, 3 Drawing Sheets

Related U.S. Application Data continuation of application No. 14/584,255, filed on Dec. 29, 2014, now Pat. No. 10,127,903.

(60) Provisional application No. 62/086,467, filed on Dec. 2, 2014.

(51) Int. Cl.
| | | |
|---|---|---|
| *G06F 16/33* | (2019.01) | |
| *G06F 16/2458* | (2019.01) | |
| *G10L 15/10* | (2006.01) | |
| *G10L 15/19* | (2013.01) | |
| *G06F 16/21* | (2019.01) | |

(52) U.S. Cl.
CPC .............. *G10L 15/10* (2013.01); *G10L 15/19* (2013.01); *G06F 16/219* (2019.01); *G06F 16/2465* (2019.01)

(56) References Cited

U.S. PATENT DOCUMENTS

| | | | | |
|---|---|---|---|---|
| 7,882,087 | B2* | 2/2011 | Johnson | G06F 16/24568 707/700 |
| 8,271,404 | B2* | 9/2012 | Gulwani | G06F 11/3608 706/12 |
| 8,316,012 | B2* | 11/2012 | Abouzied | G06F 16/283 707/718 |
| 8,788,484 | B2* | 7/2014 | Cammert | G06F 16/24575 707/718 |
| 8,887,286 | B2 | 11/2014 | Dupont et al. | |
| 9,405,792 | B2* | 8/2016 | Gross | G06F 16/95 |
| 9,767,427 | B2* | 9/2017 | Liu | G06Q 10/087 |
| 10,235,436 | B2* | 3/2019 | Nano | G06F 16/24568 |
| 2009/0216787 | A1* | 8/2009 | Wang | G06F 16/2477 707/E17.05 |
| 2011/0131198 | A1* | 6/2011 | Johnson | G06F 16/24568 707/714 |
| 2014/0337421 | A1 | 11/2014 | Edlund et al. | |
| 2014/0337510 | A1 | 11/2014 | Gesmann | |
| 2014/0337513 | A1 | 11/2014 | Amalapurapu et al. | |

OTHER PUBLICATIONS

Lee, J., et al. "An EER-based Conceptual Model and Query Language for Time-series Data" Conceptual Modeling—ER '98, 17th International Conference on Conceptual Modeling. Nov. 1998. (15 Pages).

Lee, Y., et al. "A System Architecture for Monitoring Sensor Data Stream" Seventh International Conference on Computer and Information Technology (CIT 2007) Oct. 2007. pp. 1026-1031.

Snodgrass, R., et al. "Aggregates in the Temporary Query Language TQuel" IEEE Transactions on Knowledge and Data Engineering, vol. 5, No. 5. Oct. 1993. pp. 826-842.

Sen, A. et al. "Detecting Temporal Logic Predicates in Distributed Programs Using Computation Slicing" Principles of Distributed Systems Lecture Notes in Computer Science vol. 3144, 2004. (14 Pages).

Yang, J., et al. "Maintaining Temporal Views Over Non-Temporal Information Sources For Data Warehousing" Proceedings of the 6th International Conference on Extending Database Technology: Advances in Database Technology. Mar. 1998. pp. 1-35.

List of IBM Patents or Patent Applications Treated as Related dated Sep. 3, 2019, 2 pages.

\* cited by examiner

DISCOVERING WINDOWS IN TEMPORAL PREDICATES

BACKGROUND

The present invention relates generally to information processing and, in particular, to discovering windows in temporal predicates.

For event processing, it is often useful to specify a collection of events using a temporal predicate. A temporal predicate is a Boolean formula that refers to time (i.e., a Boolean formula with a variable "now"). Given the current time and a set of events that have already occurred, the problem is to compute the set of events that satisfy the temporal predicate. Using a temporal predicate is both powerful (since predicates can be expressive) and intuitive (since Boolean formulas are easy to comprehend). As time progresses, the truth value of the predicate for each individual event may change. The challenge is to efficiently maintain the collection of events that satisfy the predicate.

One prior art approach to event processing involves tracking the truth of predicates for each event separately. However, this approach suffers from drawbacks. For example, whenever time progresses, the system must discover all stored historical events whose truth values have changed. This discovery operation is expensive in terms of, e.g., computational resources.

Another prior art approach to event processing involves an explicitly-specified window. However, this approach also suffers from drawbacks. For example, the use of an explicitly-specified window restricts expressiveness and can make the program less intuitive.

SUMMARY

According to an aspect of the present principles, a method is provided. The method includes separating a predicate that specifies a set of events into a temporal part and a non-temporal part. The method further includes comparing the temporal part of the predicate against a predicate of a known window type. The method also includes determining whether the temporal part of the predicate matches the predicate of the known window type. The method additionally includes replacing (i) the non-temporal part of the predicate by a filter, and (ii) the temporal part of the predicate by an instance of the known window type, responsive to the temporal part of the temporal predicate matching the predicate of the known window type. The instance is parameterized with substitutions used to match the temporal part of the predicate to the predicate of the known window type.

According to another aspect of the present principles, a system is provided. The system includes a temporal predicate separator for separating a predicate that specifies a set of events into a temporal part and a non-temporal part. The system further includes a predicate-to-window matcher for comparing the temporal part of the predicate against a predicate of a known window type and determining whether the temporal part of the predicate matches the predicate of the known window type. The system also includes a temporal predicate replacer for replacing (i) the non-temporal part of the predicate by a filter, and (ii) the temporal part of the predicate by an instance of the known window type, responsive to the temporal part of the temporal predicate matching the predicate of the known window type. The instance is parameterized with substitutions used to match the temporal part of the predicate to the predicate of the known window type.

According to yet another aspect of the present principles, a computer program product is provided for discovering windows in temporal predicates. The computer program product includes a computer readable storage medium having program instructions embodied therewith. The program instructions are executable by a computer to cause the computer to separate a predicate that specifies a set of events into a temporal part and a non-temporal part. Further, the program instructions are executable by a computer to cause the computer to compare the temporal part of the predicate against a predicate of a known window type. Also, the program instructions are executable by a computer to cause the computer to determine whether the temporal part of the predicate matches the predicate of the known window type. Additionally, the program instructions are executable by a computer to cause the computer to replace (i) the non-temporal part of the predicate by a filter, and (ii) the temporal part of the predicate by an instance of the known window type, responsive to the temporal part of the temporal predicate matching the predicate of the known window type. The instance is parameterized with substitutions used to match the temporal part of the predicate to the predicate of the known window type.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

The present principles are directed to discovering windows in temporal predicates.

In an embodiment, we describe each known window type w by a temporal predicate p. Given a temporal predicate p that specifies a collection of events, compare the temporal predicate p against each known window type w to determine if a match exists there between. If the temporal predicate p and a known window type w match, we use the known window type w to implement the temporal predicate p.

Some of the many attendant advantages of the present principles include, but are not limited to, the following. For several types of windows, there are techniques for tracking window contents efficiently. Once a replacement window has been found for a predicate, these techniques become directly applicable. Since the replacement was discovered automatically, the user was still able to use a temporal predicate to specify the collection, retaining expressiveness and ease-of-use.

Figure 1:
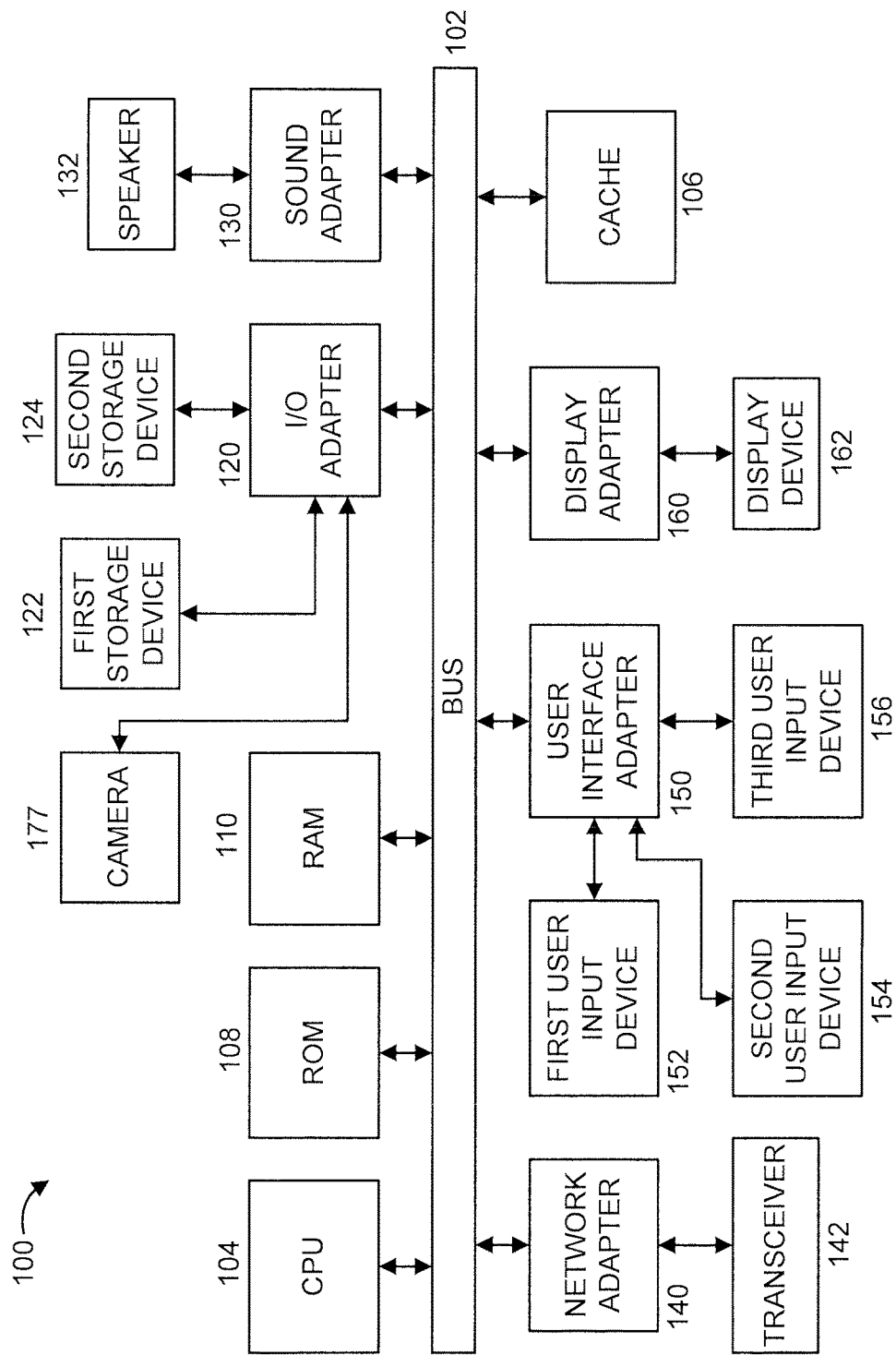
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, while described as a processing system, system 100 can be an event processing system or part of an event processing system. These and other variations of the processing system 100 are readily contemplated by one of ordinary skill in the art given the teachings of the present principles provided herein.

Figure 2:
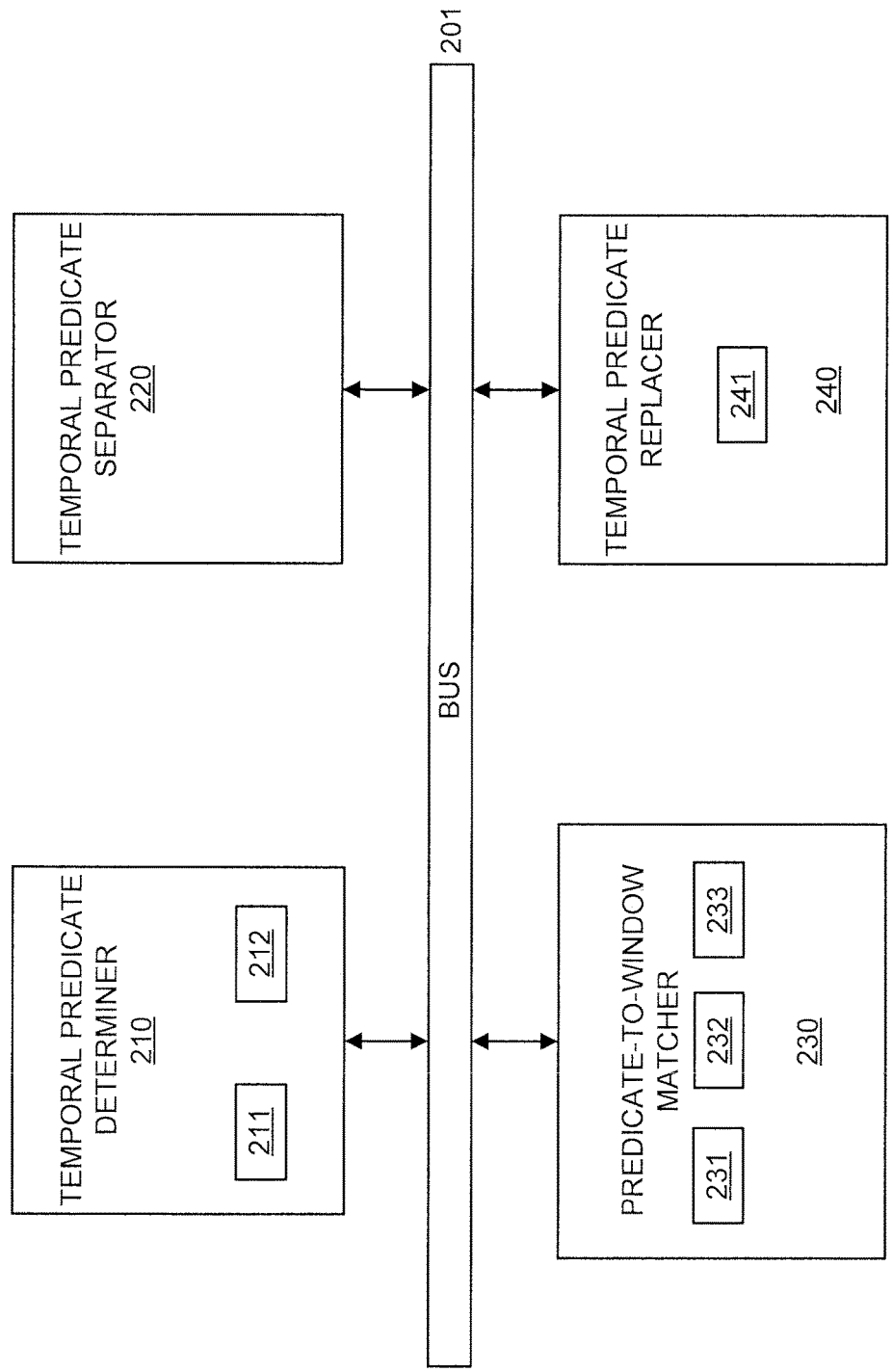
FIG. 2 shows an exemplary system 200 for discovering windows in temporal predicates, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
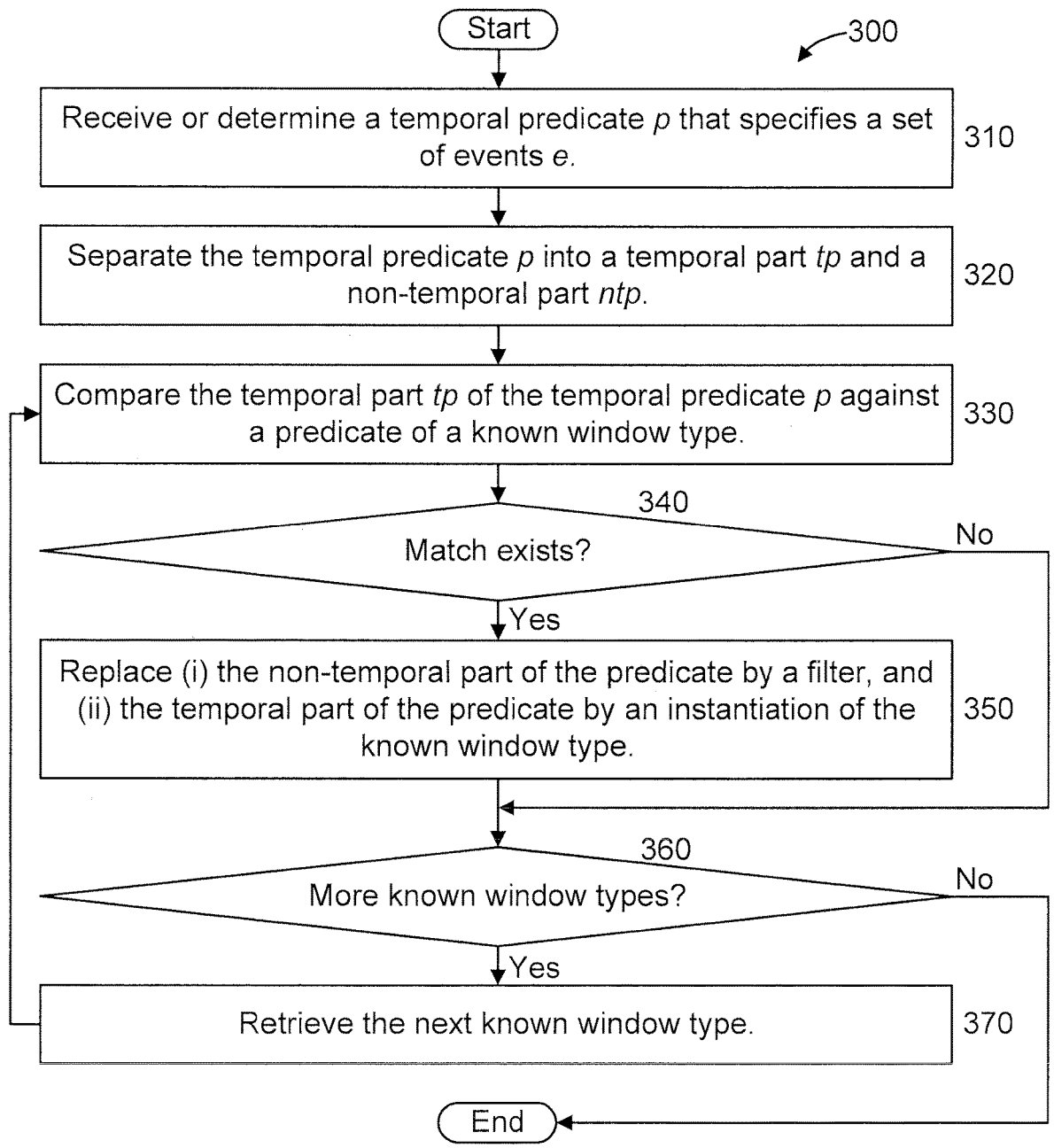
FIG. 3 shows an exemplary method 300 for discovering windows in temporal predicates, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for discovering windows in temporal predicates, in accordance with an embodiment of the present principles. The system 200 can be a stand-alone system or part of an event processing system.

The system 200 includes a temporal predicate determiner 210, a temporal predicate separator 220, a predicate-to-window matcher 230, and a temporal predicate replacer 240.

The temporal predicate determiner 210 determines temporal predicates that specify respective sets of events. The temporal predicate determiner 210 can determine the temporal predicates on its own, or receive already determined temporal predicates. For example, in an embodiment, the temporal predicate determiner 210 includes a user input device 211 (e.g., a mouse, a keyboard, a microphone, etc.) for receiving temporal predicates specified by a user of system 200. In an embodiment, the temporal predicate determiner 210 includes a communication interface 212 (e.g., a network interface card, a transceiver, and so forth) for receiving temporal predicates from a remote source. These and other variations of temporal predicate determiner 210 are readily determined by one of ordinary skill in the art, while maintaining the spirit of the present principles.

The temporal predicate separator 220 separates a temporal predicate p into a temporal part tp and a non-temporal part ntp.

The predicate-to-window matcher 230 compares the non-temporal part ntp of a temporal predicate p to a predicate of a known window type w to determine if a match exists there between. In an embodiment, the predicate-to-window matcher 230 can include a syntactic match identifier 231 and/or a satisfiability solver(s) 232 and/or a window discovery language augmenter 233. The syntactic match identifier 231 identifies syntactic matches between the temporal part tp of the temporal predicate p and the known window type w. The satisfiability solver(s) 232 identifies matches between the temporal part tp of the temporal predicate p and the known window type w, and can use satisfiability-modulo-theories techniques. Of course, other types of satisfiability solvers can also be used in accordance with the teachings of the present principles, while maintaining the spirit of the present principles. The window discovery language augmenter 233 augments the language used to describe temporal predicates with features that facilitate window discovery. For example, such features can include, but are not limited to, language phrases directly characterizing window size or bucket size. These and other variations of predicate-to-window matcher 230 are readily determined by one of ordinary skill in the art, while maintaining the spirit of the present principles.

The temporal predicate replacer 240 replaces the non-temporal part ntp of the temporal predicate p by a filter f and replaces the temporal part tp of the temporal predicate p by an instantiation of the known window type w. In an embodiment, the temporal predicate replacer includes a substitution parameterizer 241 for parameterizing the known window type w by any substitutions needed to match the known window type w to the temporal part tp of the temporal predicate p. For example, these substitutions can include, but are not limited to, window size or bucket size.

In the embodiment shown in FIG. 2, the elements thereof are interconnected by a bus 201. However, in other embodiments, other types of connections can also be used. Moreover, in an embodiment, at least one of the elements of system 200 is processor-based. Further, while certain elements of system 200 are shown as part of other elements, in other embodiments one or more of the certain elements can be implemented as standalone elements. These and other variations of the elements of system 200 are readily determined by one of ordinary skill in the art, given the teachings of the present principles provided herein, while maintaining the spirit of the present principles.

FIG. 3 shows an exemplary method 300 for discovering windows in temporal predicates, in accordance with an embodiment of the present principles.

At step 310, receive or determine a temporal predicate p that specifies a set of events e.

At step 320, separate the temporal predicate p into a temporal part tp and a non-temporal part ntp. In an embodiment, step 320 can be performed using a conjunctive normal form.

At step 330, compare the temporal part tp of the temporal predicate p against a predicate of a known window type.

At step 340, determine if a match exists between the temporal part tp of the temporal predicate p and the predicate of the known window type. If so, then the method proceeds to step 350. Otherwise, the method proceeds to step 360. In an embodiment, step 340 can be performed by finding a syntactic match. However, for more general cases, satisfiability solvers can be used. Such satisfiability solvers include, but are not limited to, satisfiability modulo theories.

At step 350, replace (i) the non-temporal part of the predicate by a filter, and (ii) the temporal part of the predicate by an instantiation of the known window type, responsive to the temporal part of the temporal predicate matching the predicate of the known window type. In an embodiment, step 350 can include parameterizing the known window type w by any substitutions needed to match the predicate of the known window type w to the non-temporal part ntp of the temporal predicate p.

At step 360, determine if there are any more known window types. If so, the method proceeds to step 370. Otherwise, the method is terminated.

At step 370, retrieve the next known window type, and return to step 330 (so as to repeat steps 330 through 350 for the next known window type).

We now describe an example for the sake of illustration, in accordance with an embodiment of the present principles.

In the example, we define "TotalWeight" as the total weight of the luggage of all flight events during the last period of 1 hour, where the flight number of each flight event starts with "AF".

Hence, in the example "TotalWeight" functions as a rule. The rule performs an aggregation ("Total", i.e., sum) over a collection of events e specified using the following temporal predicate p:

(p1) e is a flight event
(p2) AND e falls into the last period of 1 hour
(p3) AND the flight number of e starts with "AF"

The preceding temporal predicate p specifying the collection of events e corresponds to step 310 of method 300.

Note that temporal predicate p includes parts p1, p2, and p3. Also note that only part p2 is time-dependent, whereas parts p1 and p3 are time-independent. Hence, in this example, part p2 can be considered to be the temporal part tp of the temporal predicate p, and parts p1 and p3 can be considered to be the non-temporal part ntp of the temporal predicate p. The separation of the temporal predicate p into non-temporal parts p1 and p3 and temporal part p2 corresponds to step 320 of method 300. We assume that once received, events are immutable, so parts p1 and p3 remain constant. We can make the predicate p more precise as follows:

$$e.t >= \text{now} - \text{``1 hour''} \text{ AND } p1(e) \text{ AND } p3(e) \quad (p)$$

where "e.t" denotes the time of event e, and "now" denotes the current time.

In the example, the first known window type w for which a match is attempted in step 340 of method 300 is a sliding window of size T. The events in such a sliding window can be characterized by the following temporal predicate:

$$e.t >= \text{now} - T \quad (w)$$

Step 340 determines that a match exists by substituting "1 hour" for "T".

The temporal predicate p describes a simple sliding window, and the temporal part tp of p matches the window size T of the known window type w when we replace the window size T (of the known window type) by "1 hour" (from the temporal part tp of the temporal predicate p). In particular, we replace (i) the non-temporal part ntp of the temporal predicate p by a filter, and (ii) the temporal part tp of the temporal predicate p by the window size T of the known window type w, responsive to the temporal part tp of the temporal predicate p matching the known window type w (per step 350 of method 300). The preceding means that for this example, an efficient implementation would first filter arriving events e by p1(e) and p3(e), while all remaining events would be tracked in a sliding 1-hour window. Also, the summation can be maintained efficiently by addition and subtraction as each event enters and leaves the window.

More generally, there are several other possible known window types, including but not limited to, tumbling windows, unbounded windows, coarse-grained sliding windows (a.k.a., sliding bucketed windows), and so forth. Furthermore, besides measuring time using physical units such as seconds, minutes, or hours as in the example above, windows can also measure time using logical units such as the number of events or the delta between attributes of earlier versus later events.

Also, there are several other possible aggregations, including but not limited to count, average, minimum, maximum, standard deviation, argument of the minimum (arg-min), argument of the maximum (arg-max), collect, and so forth.

If the collection of events is used in an aggregation, rather than materializing the collection, we instead just maintain that aggregation incrementally as events enter and leave the collection. For invertible aggregations, this involves simple addition and subtraction. For example, an incremental computation for the average aggregation works by incrementally maintaining a sum and a count. Each event that enters the collection adds its value to the sum and one to the count. Each event that leaves the collection subtracts its value from the sum and one from the count. The current value of the average is simply the sum divided by the count.

Non-invertible aggregations can be handled efficiently with balanced trees as long as the aggregations are associative. For example, an incremental computation for the minimum aggregation works by keeping the values of all events in the leaves of a tree, and keeping, in each non-leaf node, the minimum of its children. When a new event enters the collection, its value is added as a leaf, and, when an event leaves the collection, the corresponding leaf is removed. In both cases, the tree is rebalanced, and all affected leaf-to-root paths are updated. Thus, the root of the tree always maintains the minimum value of all leaves.

Furthermore, if the window involves buckets (also known as panes), the implementation can pre-aggregate per bucket, thus saving memory, before applying one of the other algorithms at the level of entire buckets, thus saving time.

In a variation of the present principles, the language for temporal predicates is augmented with features that facilitate window discovery. In other words, the window discovery is not fully automatic, but partially automatic. For example, the discovery algorithm might automatically discover the window type and size, but the language might explicitly specify the buckets.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
separating a predicate that specifies a set of events into a temporal part and a non-temporal part;
comparing the temporal part of the predicate against a predicate of a known window type;
determining whether the temporal part of the predicate matches the predicate of the known window type; and
replacing (i) the non-temporal part of the predicate by a filter, and (ii) the temporal part of the predicate by an instance of the known window type, responsive to the temporal part of the temporal predicate matching the predicate of the known window type,
wherein the set of events is specified by first filtering the set of events by the filter replacing the non-temporal part of the predicate, with any remaining events being tracked in the instance of the known window type that replaced the temporal part of the predicate, and
wherein a window of the known window type is associated with one or more buckets that are pre-aggregated at a bucket-level upon event arrival.

2. The method of claim 1, wherein said separating step uses a conjunctive normal form to separate the temporal part and the non-temporal part.

3. The method of claim 1, wherein said determining step searches for a syntactic match between the temporal part of the predicate and the window size of the known window type.

4. The method of claim 1, where said determining step determines a match or mismatch responsive to an output of a satisfiability solver.

5. The method of claim 1, wherein the predicate is expressed as a Boolean equation having a current time component.

6. The method of claim 1, wherein the set of events is used in an aggregation that is incrementally maintained as events are added to and removed from the set of events.

7. The method of claim 1, further comprising augmenting language used to describe the predicate with one or more features that facilitate window discovery.

8. A system, comprising:
a temporal predicate separator for separating a predicate that specifies a set of events into a temporal part and a non-temporal part;
a predicate-to-window matcher for comparing the temporal part of the predicate against a predicate of a known window type and determining whether the temporal part of the predicate matches the predicate of the known window type; and
a temporal predicate replacer for replacing (i) the non-temporal part of the predicate by a filter, and (ii) the temporal part of the predicate by an instance of the known window type, responsive to the temporal part of the temporal predicate matching the predicate of the known window type,
wherein the set of events is specified by first filtering the set of events by the filter replacing the non-temporal part of the predicate, with any remaining events being tracked in the instance of the known window type that replaced the temporal part of the predicate, and
wherein a window of the known window type is associated with one or more buckets that are pre-aggregated at a bucket-level upon event arrival.

9. The system of claim 8, wherein said temporal predicate separator uses a conjunctive normal form to separate the temporal part and the non-temporal part.

10. The system of claim 8, wherein said predicate-to-window matcher searches for a syntactic match between the temporal part of the predicate and the window size of the known window type.

11. The system of claim 8, where said predicate-to-window matcher determines a match or mismatch responsive to an output of a satisfiability solver.

12. The system of claim 8, wherein the predicate is expressed as a Boolean equation having a current time component.

13. The system of claim 8, wherein the set of events is used in an aggregation that is incrementally maintained as events are added to and removed from the set of events.

14. The system of claim 8, further comprising a window discovery language augmenter for augmenting language used to describe the predicate with one or more features that facilitate window discovery.

15. A computer program product for discovering windows in temporal predicates, the computer program product comprising a computer readable storage medium having program instructions embodied therewith, the program instructions executable by a computer to cause the computer to:
separate a predicate that specifies a set of events into a temporal part and a non-temporal part;
compare the temporal part of the predicate against a predicate of a known window type;
determine whether the temporal part of the predicate matches the predicate of the known window type; and
replace (i) the non-temporal part of the predicate by a filter, and (ii) the temporal part of the predicate by an instance of the known window type, responsive to the temporal part of the temporal predicate matching the predicate of the known window type, wherein the set of events is specified by first filtering the set of events by the filter replacing the non-temporal part of the predicate, with any remaining events being tracked in the instance of the known window type that replaced the temporal part of the predicate, and wherein a window of the known window type is associated with one or more buckets that are pre-aggregated at a bucket-level upon event arrival.

16. The computer program product of claim 15, wherein said separate step uses a conjunctive normal form to separate the temporal part and the non-temporal part.

17. The computer program product of claim 15, wherein said determine step searches for a syntactic match between the temporal part of the predicate and the window size of the known window type.

18. The computer program product of claim 15, where said determine step determines a match or mismatch responsive to an output of a satisfiability solver.

* * * * *